Dec. 31, 1929.  F. H. GODFREY  1,741,621
CONNECTING ROD
Filed Oct. 8, 1927
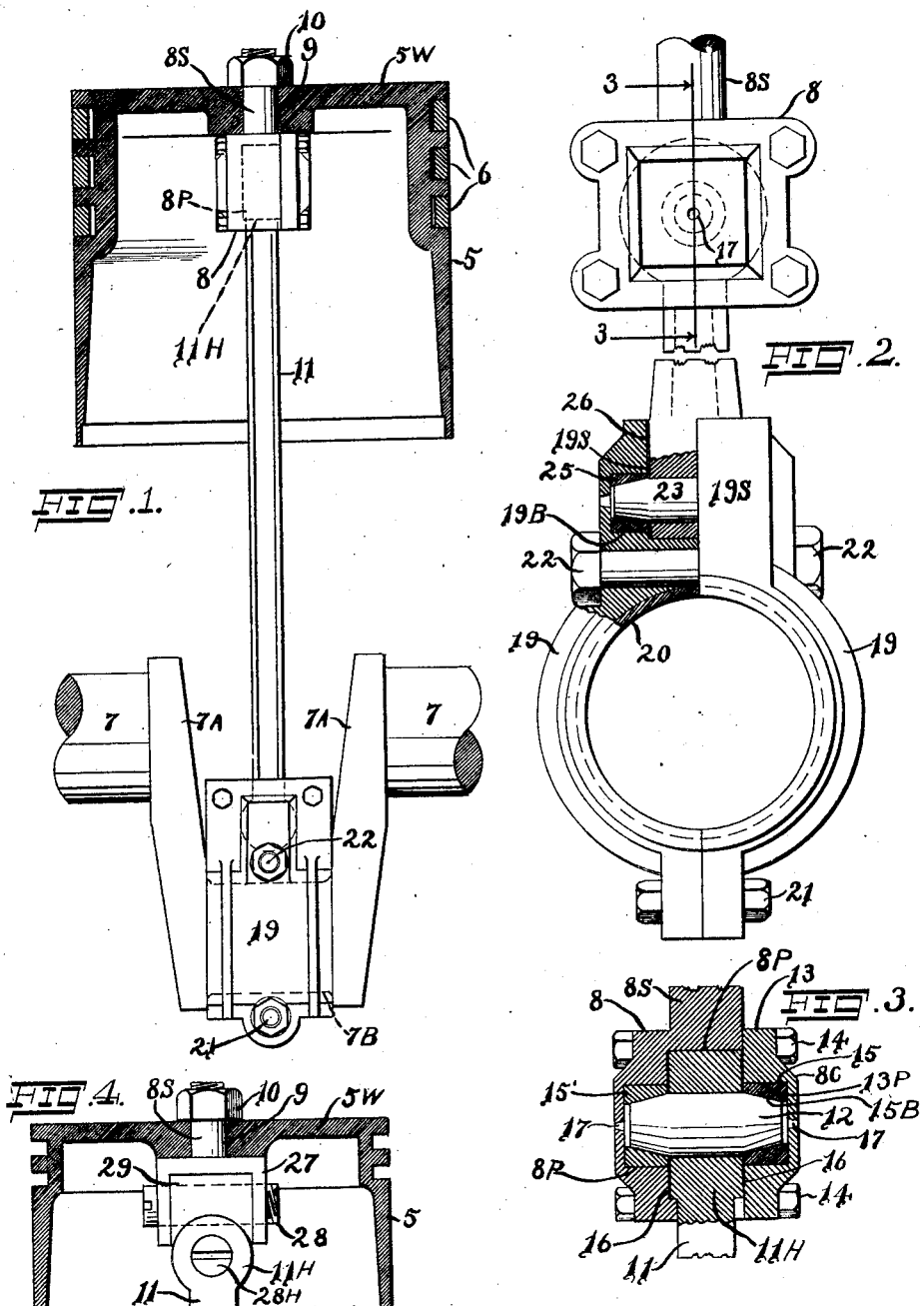
INVENTOR.
Frank H. Godfrey
BY David E. Carlsen
ATTORNEY Patented Dec. 31, 1929

1,741,621

UNITED STATES PATENT OFFICE

FRANK H. GODFREY, OF ST. PAUL, MINNESOTA

CONNECTING ROD

Application filed October 8, 1927. Serial No. 225,004.

My invention relates to improvements in connecting rods including their connections with pistons and crank shafts. The main object of the invention is the provision of a connecting rod having certain simple and advantageous means connecting it with a piston and likewise with the bearing part of the crank shaft, including various features of construction practically eliminating wear and tear to bearing parts which may become out of proper alignment. Other objects will be fully disclosed in the following specification, reference being had to the accompanying drawing in which,—

Fig. 1 is an elevation of my improved connecting rod in operative position showing a piston in cross section and a corresponding part of a crank shaft.

Fig. 2 is an enlarged face view of the connecting rod only shown in Fig. 1, and partly in section, the piston and crank shaft being omitted.

Fig. 3 is a cross sectional view of the connecting rod head casing on line 3—3 in Fig. 2.

Fig. 4 is a modification of the upper part of Fig. 1.

Referring to the drawing by reference numerals 5 designates a common type of piston for gas engines and having the piston rings 6. 7 is the usual crank shaft in spaced relation and below the piston, and 7A are the opposite side arms of said shaft extending to the integral bearing part 7B engaged by the lower end of the connecting rod.

My improved connecting rod involves the use of a special trunnion block 8 with an integral upwardly directed stud 8S projecting above the top of the piston through a central aperture 9 therein and its upper end threaded for a nut 10 to hold the block rigid to the top or web 5W of the piston. The connecting rod 11 is preferably of the so-called I-beam shape in cross section and widened downwardly and formed with a rounded head 11H bored transversely for the wrist pin 12. Block 8 is open at one side and a round pocket 8P bored therein to receive head 11H and slitted downwardly for the connecting rod proper. 13 is a cap to close the said bored side of the block and fixed thereto as with bolts 14 passed through the block. This cap 13 also has a pocket 13P bored in it to receive a bushing 15 with an outwardly tapered bore 15B to receive the correspondingly tapered end of pin 12, while 15' is a similar bushing in a counterbore inwardly of the bore 8P in the block 8 to rotatably retain the other tapered end of the pin 12, it being understood that said pin 12 is straight through the bore of the connecting rod head. 16 in Fig. 3 indicates shims between cap 13 and block 8, said shims being inserted and removable as needed to allow the parts to be drawn together suitably without too much friction on head 11H. 17 are lubrication apertures in cap 13 and block 8 adjacent opposite ends of the pin 12.

The lower part of my improved connecting rod comprises a two part bearing block 19 suitably bushed as 20 for the crank-shaft bearing 7B, both halves of the block bolted together below said bearing as at 21. Above the said bearing the two parts of the block are bolted together as at 22. 23 is what may most aptly be termed a rocking pin, similar to wrist pin 12 and located parallel to and above bolt 22 within a hollow sleeve 19S opening upwardly and above the center of the bearing block. Said latter opening, formed half in each part of block 19 comprises a pocket quadrangular in cross section and adapted to slidably receive the lower end of the connecting rod 11. The latter end is bored horizontally and parallel to bolt 22, which is of course at right angles to the wrist pin 12, for the rocking pin 23, the tapered ends of which are rotatably secured in bushings 25 of which there is one in a bore 19B of each part 19B of the bearing 19. 26 are shims between the rod 11 and the adjacent walls of pocket 19S.

It is obvious that in the main form of my device as above described, the piston is readily removable by simply loosening nut 10 and thereafter the entire connecting rod or any of its parts are readily accessible through the cylinder bore. All bearing parts can thus be readily adjusted or removed with the minimum of effort. Should the crank shaft become out of alignment with the trunnion block, the bar 11 will oscillate slightly on pin 23, but rigidity is maintained between the parts of the connecting rod at all times.

In Fig. 4 I have illustrated a modified form of the trunnion block in the piston and in which the block is simply an inverted U-shape yoke 27 the depending arms of which are bored for a main pin 28 (corresponding to pin 12 in Figs. 2 and 3) on which is oscillatably mounted a block 29. 28H is a similar trunnion pin below pin 28 and rotatable in the block 29 just below its main bore and at right angles to pin 28 said pin 28H adapted to pivotally engage the head 11H of the connecting rod, the latter head in this case being of course, bifurcated. In this modified structure the joint has the so-called universal joint action and rod 11 is not sprung or strained if the crank shaft bearing and the trunnion bearing are considerably out of alignment.

I claim:

1. In a connecting rod having suitable wrist pin connection at one end; crank shaft bearing means adjacent the other end comprising two counterpart bearing blocks with a pocket adapted to receive and retain the said latter end of the connecting rod, a rocking pin removably mounted in said bearing blocks and pivotally engaging the said end of the connecting rod, the longitudinal center line of said pin in a common plane with the oscillating plane of the crank-shaft bearing.

2. The structure specified in claim 1 in which said rocking pin is tapered at its opposite ends, counterbored bushings in said pocket part of the crank shaft bearing means and adapted to engage the tapered ends of the said rocking pin.

In testimony whereof I affix my signature.

FRANK H. GODFREY.